Dec. 2, 1969  D. F. ENGSTROM  3,481,248
DRAWBAR FOR MACHINE TOOLS
Filed Dec. 28, 1967  2 Sheets-Sheet 2

INVENTOR:
DONALD F. ENGSTROM
BY: James E. Nilles
ATTORNEY

United States Patent Office 3,481,248
Patented Dec. 2, 1969

3,481,248
DRAWBAR FOR MACHINE TOOLS

Donald F. Engstrom, Racine, Wis., assignor to Gorton Machine Corporation, Racine, Wis., a corporation of Wisconsin
Filed Dec. 28, 1967, Ser. No. 694,153
Int. Cl. B23c 1/00, 3/00, 7/00
U.S. Cl. 90—11      6 Claims

ABSTRACT OF THE DISCLOSURE

A power operated drawbar for engaging and disengaging a tool holder of a spindle of a machine tool. The drawbar utilizes an air motor for the source of power and an air cylinder for actuating a clutching ring.

FIELD OF THE INVENTION

The invention pertains to metal working machines of the type having a rotatable spindle in which a tool holder can be inserted, and a power drawbar is located in the spindle and threadably engages and disengages with the tool holder.

DESCRIPTION OF THE PRIOR ART

The present invention provides a power operated drawbar for a machine tool spindle which is compact in size, has relatively few parts and is simple in operation and construction, and is economical to manufacture. In these respects, the invention is an improvement over prior art U.S. patents such as Nos. 2,667,819, issued on Feb. 2, 1954, to De Vlieg; 2,924,152 issued on Feb. 9, 1960, to Zettler; and 3,038,386 issued to Porske et al. on June 12, 1962.

In each of these prior art devices, an electric motor and gear train are utilized as the power source and drive for the drawbar; both clutch engagement and disengagement is accomplished by moving clutch teeth together either by centrifugal force or an electric solenoid; each of the tooth clutches is carried by a spline to provide the driving force when engagement is accomplished; the drawbar is biased in a rearward (retracted) position either by a spring or by hand pressure when loading a tool. As a result, these prior art devices are complicated and costly.

SUMMARY OF THE INVENTION

The present invention provides a compact, efficient and economical drawbar for a machine tool spindle, which drawbar is power operated by an air driven, impact motor having short rapid strokes, and clutching between the motor and drawbar is accomplished by an air solenoid actuated locking ring which locks a pair of balls in drive grooves.

In the majority of tool changing operations, it is necessary to raise the spindle to provide the necessary clearance for tool removal. With the present invention it is necessary to raise the spindle to the retracted position to engage or disengage the tool. However, because of the use of an air drive, impact motor, the motor stops between strokes and the tool will not spin while being engaged and the necessity for biasing the drawbar away from the tool holder, and the consequent cost of manufacture, have been eliminated.

The present invention utilizes an air solenoid actuated locking ring which locks balls in drive grooves (avoiding the necessity of splines for the tooth clutches of the prior art) only when the drawbar is returned to raised position, thus providing the drive force.

DESCRIPTION OF THE PREFERRED EMBODIMENT

Figure 1:
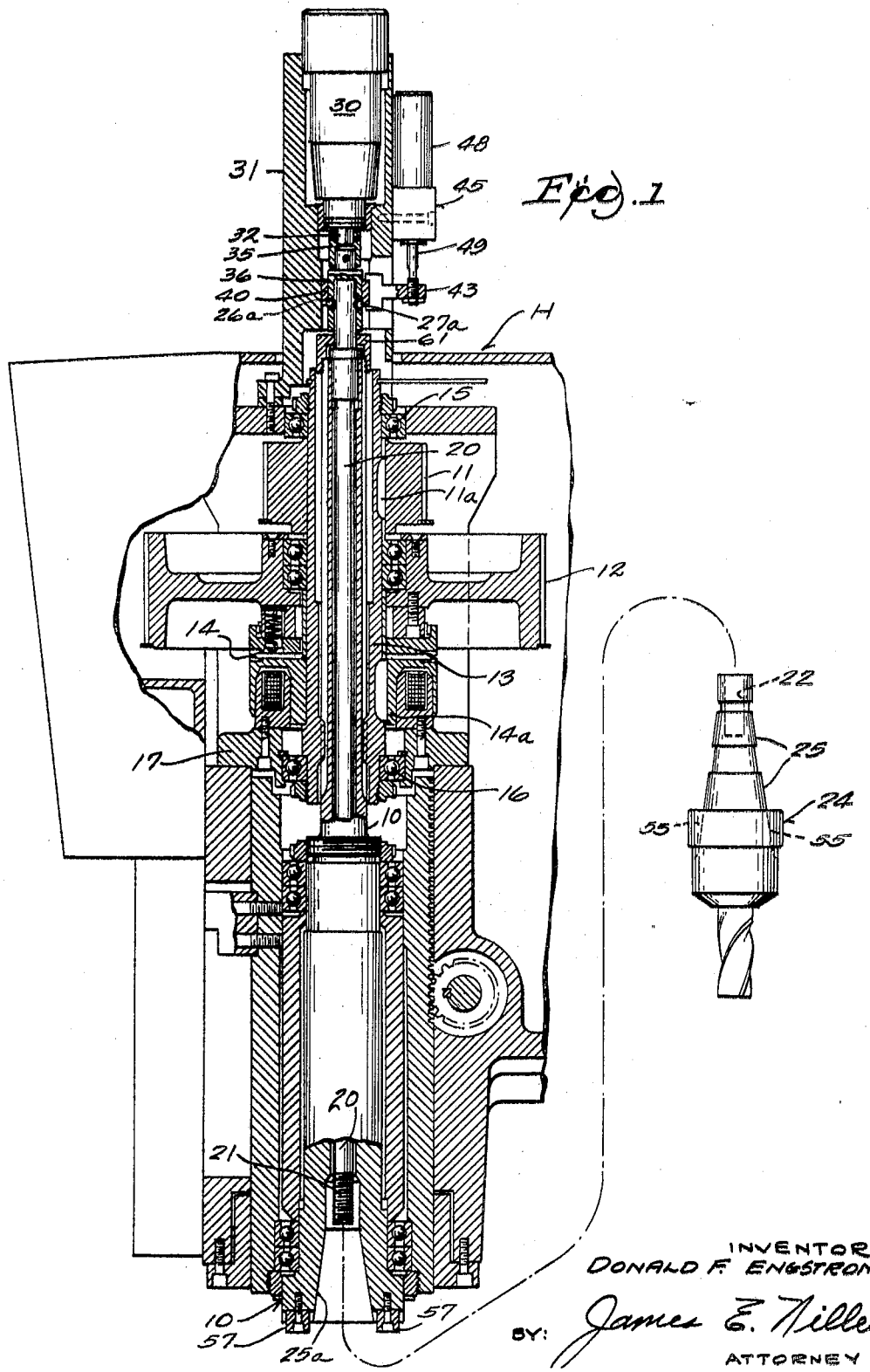
FIGURE 1 is a vertical view, partially in section of a machine tool spindle which uses the present invention.

The machine tool head shown in FIGURE 1 is of the general type shown in U.S. application Ser. No. 497,821 filed Oct. 19, 1965, entitled "Metal Working Machine," and assigned to a common assignee, and which issued as U.S. Patent No. 3,381,545 on March 7, 1968. If a complete description of the drive mechanism for the spindle is deemed to be either necessary or desirable, reference may be had to that patent. It is believed sufficient to say for purposes of this disclosure, however, that the rotatable driving power for the spindle 10 is furnished selectively to either of the timing pulleys 11 or 12. Pulley 11 is keyed at 11a directly to the spindle drive sleeve 13, while pulley 12 is disengagably connectible to the sleeve by a clutch 14 and a collar 14a is keyed to the sleeve.

The drive sleeve is journalled by anti-friction bearing assemblies 15 and 16 in the frame 17 of the head H.

A drawbar 20 extends downwardly through the center of tubular spindle 10 and its lower end is threaded at 21 to engage the internal threads 22 of the tool holder 24, in the known manner. The tapered portion 25 of the holder is complementary to and abuttable with the internal tapered surface 25a of the lower end spindle.

Figure 2:
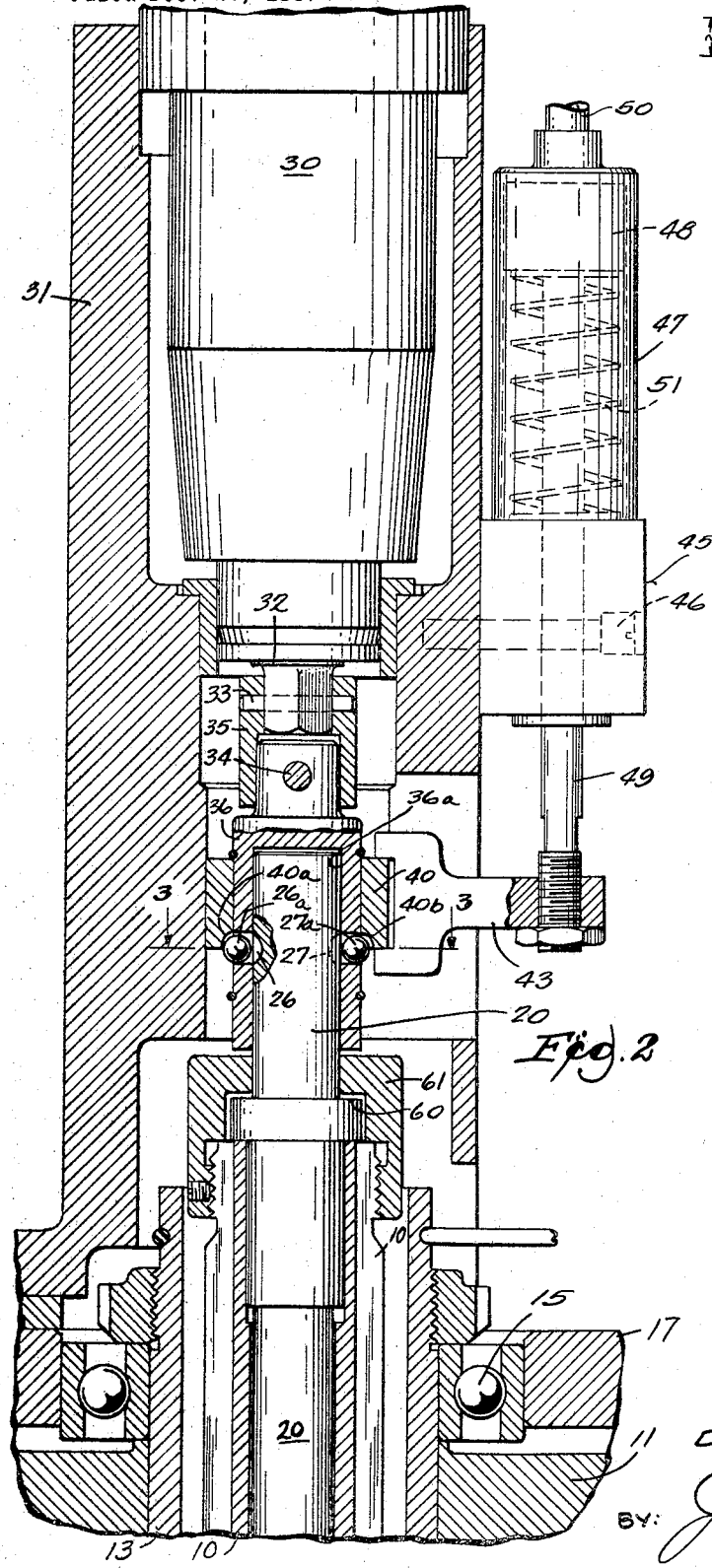
FIGURE 2 is an enlarged, sectional view of the upper portion of the device shown in FIGURE 1, and showing the present invention.
Figure 4:
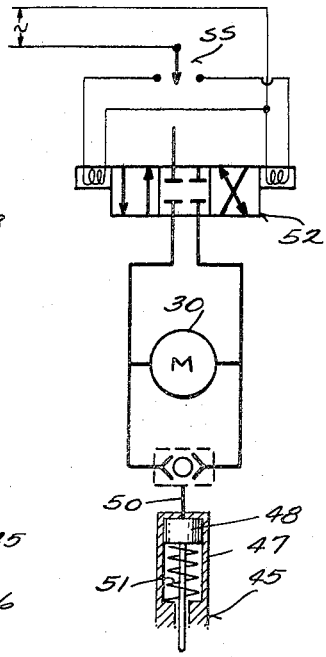
FIGURE 4 is a combined electrical and air circuit diagram used with the present invention.
Figure 3:
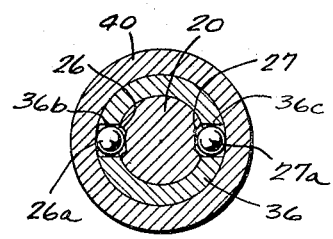
FIGURE 3 is a sectional view taken along line 3—3 in FIGURE 2.

As shown best in FIGURES 2 and 3, the upper end of the drawbar 20 has a pair of diametrically opposite drive grooves 26 and 27 formed on its side which receive the respective steel balls 26a and 27a when the drawbar is engaged, as will appear presently.

An air impact motor 30 is secured in a bracket 31 fixed to and extending upwardly from the machine head. The drive shaft 32 of the motor extends downwardly and is fixed by pins 33 and 34, and sleeve 35, to its drive chuck 36. The upper end of the drawbar 20 extends into the hole 36a of the chuck 36, and slots 36b and slots 36c formed through diametrically opposite sides of the chuck carry the balls 26a and 27a and are alignable with grooves 26 and 27, when the drawbar is in the upper retracted position shown.

When the drawbar is in this upper position, due to the fact that the spindle 10 (which carries the drawbar) is in the upper position, the drawbar can be engaged with or disengaged from the air motor as follows.

A locking ring 40 is axially slidably mounted around chuck 36 and has a pair of opposite cam surfaces 40a and 40b which are engagable with the respective balls 26a and 27b. When the ring 40 is forced downwardly (as viewed in FIGURE 2) by a shifting yoke 43, the motor shaft is then clutched to the drawbar because the balls have been forced radially inwardly into grooves 26 and 27.

The means for shifting the ring 40 into the clutching position is comprised of a one-way, air operated cylinder means 45 rigidly attached to the bracket 31 by screw means 46. The cylinder means includes the cylinder 47 in which is slidable the piston 48 and its attached rod 49, the latter of which is fixed to the shifting yoke. Air pressure enters the cylinder behind the piston by means of conduit 50 to cause extension of the rod and clutching of the drawbar. A spring 51 in the cylinder causes rod retraction and consequent declutching when the air pressure is shut off from the cylinder as follows.

A selector switch SS controls a four way solenoid valve 52 and air can be directed to the air impact motor and also simultaneously into the cylinder means 45. This causes clutching of the air motor to the drawbar and rotation of the motor and drawbar in one direction. The tool holder 24 is then guided manually into the spindle to be threadably engaged by the drawbar. The tool holder is manually prevented from rotating until its recesses 55 engage the keys 57 of the spindle, thus securing the tool holder in operative position. The selector switch SS is manually activated only until the tool holder is seated properly. When the switch is released, the solenoid valve is returned to center or neutral by its spring, thus blocking air to the motor 30 and to the cylinder 45. The spring 51 of the cylinder then causes the piston to retract, thus withdrawing the locking ring 40 from the clutch engaged position and disconnecting the motor from the drawbar. The spindle 10 is then free to move.

In order to disengage the tool holder, the spindle must be in an upper position so that the drive chuck 36 can engage the drawbar. Air is directed by the solenoid valve to the air motor and to the cylinder 45. The latter then lowers the locking ring 40, thereby causing engagement between the air motor and drawbar. The air motor then turns in the opposite direction until the drawbar is pulled upwardly until its shoulder 60 contacts nut 61. Thereupon the drawbar stops further upward movement and begins to push the tool holder 24 from the spindle 10. The tool holder is manually removed from the spindle. The selector switch is then released, blocking air to the impact motor 30 and cylinder 45, permitting the cylinder spring 51 to disengage the locking ring 40 and its associated chuck 36.

I claim:
1. In combination with a metal working machine having a rotatable spindle, a tool holder disengagably connected to said spindle, and a drawbar extending through said spindle for threadable engagement at one end with said tool holder; an air motor mounted on said machine and located adjacent the other end of said drawbar, said motor having a drive shaft, said drive shaft having an axially extending hole, said drawbar having its outer end located in said hole, disengageable balls and grooves between said motor shaft and said drawbar for clutching said shaft and drawbar together for rotation as a unit, locking ring means for causing engagement of said balls and grooves, an air actuated cylinder means for shifting said locking ring means, and control means for causing operation of said air motor and said air actuated cylinder.

2. The combination set forth in claim 1 further characterized in that said motor drive shaft is arranged co-axially with said drawbar, and said locking ring is shiftable in an axial direction on said drive shaft to cause engagement of said balls and grooves.

3. The combination described in claim 2 further characterized in that said grooves are in said drawbar, said motor drive shaft includes a chuck, said chuck having slot means therein, and said balls are radially shiftable in said slot means for engagement with said grooves in said drawbar.

4. In combination with a metal working machine having a rotatable spindle, a tool holder disengagably connected to said spindle, and a drawbar having grooves therein, said drawbar extending through said spindle for threadable engagement at one end with said tool holder; an air motor mounted on said machine and located adjacent the other end of said drawbar, said motor having a drive shaft arranged co-axially with said drawbar, said drive shaft including a chuck having slot means therein, balls radially shiftable in said slot means for engagement with said grooves in said drawbar, locking ring means shiftable in an axial direction on said drive shaft for causing engagement of said balls in said grooves, a single acting and spring return air actuated cylinder for shifting said locking ring means, and control means for causing simultaneous rotation of said air motor and extension of said air actuated cylinder.

5. In combination with a metal working machine having a rotatable spindle, a tool holder disengagably connected to said spindle, and a drawbar extending through said spindle for threadable engagement at one end with said tool holder; an air motor mounted on said machine and located adjacent the other end of said drawbar, said motor having a drive shaft, disengagable balls and groove means between said motor shaft and said drawbar for clutching said shaft and drawbar together for rotation as a unit, locking ring means for causing engagement of said balls and groove means, a single acting and spring return power cylinder for shifting said locking ring means, and control means for causing simultaneous rotation of said air motor and extension of said air actuated cylinder.

6. The combination described in claim 5 further characterized in that said groove means are in said drawbar, said motor drive shaft includes a chuck, said chuck having slot means therein, and said balls are radially shiftable in said slot means for engagement with said groove in said drawbar.

References Cited

UNITED STATES PATENTS 2,101,366  12/1937  Frank _____ 192—71
3,374,711  3/1968   Saunders _____ 90—11

DONALD R. SCHRAN, Primary Examiner

G. WEIDENFELD, Assistant Examiner

U.S. Cl. X.R.
77—3; 192—71, 93